(12) United States Patent
Kim et al.

(10) Patent No.: US 10,882,129 B2
(45) Date of Patent: Jan. 5, 2021

(54) ELECTROCHEMICAL MACHINE CAPABLE OF REMOVING ELECTROLYTIC PRODUCT

(71) Applicant: ANYCASTING CO., LTD., Seoul (KR)

(72) Inventors: Sung Bin Kim, Seoul (KR); Kun Woong Ko, Seoul (KR)

(73) Assignee: ANYCASTING CO., LTD., Seoul (KR)

( * ) Notice: Subject to any disclaimer, the term of this patent is extended or adjusted under 35 U.S.C. 154(b) by 126 days.

(21) Appl. No.: 16/198,636

(22) Filed: Nov. 21, 2018

(65) Prior Publication Data

US 2020/0130083 A1 Apr. 30, 2020

(30) Foreign Application Priority Data

Oct. 24, 2018 (KR) ........................ 10-2018-0127829

(51) Int. Cl.
*B23H 3/10* (2006.01)
*B23H 3/04* (2006.01)

(52) U.S. Cl.
CPC ................. *B23H 3/10* (2013.01); *B23H 3/04* (2013.01)

(58) Field of Classification Search
None
See application file for complete search history.

(56) References Cited

U.S. PATENT DOCUMENTS

| | | | | |
|---|---|---|---|---|
| 2,946,731 A | * | 7/1960 | Falls | B23H 5/08 205/663 |
| 3,252,881 A | * | 5/1966 | Inoue | B23H 7/38 204/222 |
| 3,658,682 A | * | 4/1972 | Fulkerson | B23H 3/10 204/224 M |
| 9,737,946 B2 | * | 8/2017 | Suzuki | B23H 7/265 |

FOREIGN PATENT DOCUMENTS

| | | | | |
|---|---|---|---|---|
| CN | 101011765 | * | 8/2007 | ............... B23H 3/00 |
| EP | 1488878 | * | 12/2004 | ............. B23H 7/101 |

* cited by examiner

*Primary Examiner* — Stefanie S Wittenberg
(74) *Attorney, Agent, or Firm* — Park, Kim & Suh, LLC

(57) ABSTRACT

Provided is an electrochemical machine. More particularly, provided is an electrochemical machine which removes an electrolytic product generated while electrochemical machining (ECM) so as to improve the quality of ECM and allows micro ECM. The electrochemical machine according to an embodiment of the present invention may include: a processing tub filled with an electrolyte; a processed object immersed in the electrolyte filled in the processing tub; a storage unit for storing the electrolyte; an electrolyte supply unit for supplying the electrolyte stored in the storage unit to the processing tub; a manifold comprising an inflow path, to which the electrolyte supplied by the electrolyte supply unit flows, and an outflow path connected to the inflow path for discharging the electrolyte flowing to the inflow path to the processed object, wherein a discharge hole of the outflow path is immersed in the electrolyte filled in the processing tub; an electrode which is fixed to the manifold so as for one (Continued)

end thereof to pass the outflow path and to be projected toward a lower part of the discharge hole and is electrically connected to the processed object; and a power unit for supplying power to the electrode and the processed object.

16 Claims, 5 Drawing Sheets

ELECTROCHEMICAL MACHINE CAPABLE OF REMOVING ELECTROLYTIC PRODUCT

CROSS-REFERENCE TO RELATED PATENT APPLICATION

This application claims the benefit of Korean Patent Application No. 10-2018-0127829, filed on Oct. 24, 2018, in the Korean Intellectual Property Office, the disclosure of which is incorporated herein in its entirety by reference.

BACKGROUND OF THE INVENTION

Field of the Invention

The present invention relates to an electrochemical machine, and more particularly, to an electrochemical machine which removes an electrolytic product generated while electrochemical machining (ECM) so as to improve the quality of ECM and allows micro ECM.

Description of the Related Art

Electrochemical machining (ECM) is a way through which metallic oxides generated during electrochemical dissolution of metallic materials are removed, wherein the metallic oxides are gas from a cathode and anode products and disturb the electrochemical dissolution.

For example, an electrode and a processed object are respectively made to be a cathode and an anode and are face each other at a predetermined interval. Then, the electrode and the processed object are immersed in an electrolyte. When a current is applied, the processed object is processed as a surface shape of the electrode. Also, when the electrode is made to be an anode and the processed object is made to be a cathode, the processed object becomes a substrate and deposition may be stacked on the substrate according a moving path of the electrode.

However, electrolytic products such as metal ion and hydrogen gas are generated while ECM and such electrolytic products disturb stable electrolysis process.

For example, when a current is applied during ECM, gas such as hydrogen is generated according to reduction and oxidation reaction. Here, the generated gas is adsorbed around an electrode and a processed product in a form of air bubbles and changes current distribution. Accordingly, quality of a processed material may be lowered.

In regard to this, a method of moving an electrode above the surface of water, staying the electrode for few seconds, and removing air bubbles adsorbed onto the electrode and a processed product is generally used. However, such method lowers speed of the process and accuracy of a surface forming process.

Also, a method of removing air bubbles by using ultrasonic waves is generally used in ECM. However, micro ECM is hardly conducted due to vibration of ultrasonic waves and temperature of an electrolyte rises, if ultrasonic waves are used for long periods of time. Accordingly, a cooling device is further needed to keep the temperature.

SUMMARY OF THE INVENTION

The present invention provides an electrochemical machine which may remove electrolytic products generated while electrochemical machining (ECM) by discharging an electrolyte around an electrode while ECM.

The present invention also provides an electrochemical machine which may strongly fix a thin electrode onto an accurate position so as to allow micro ECM.

According to an aspect of the present invention, there is provided an electrochemical machine. The electrochemical machine may include: a processing tub filled with an electrolyte; a processed object immersed in the electrolyte filled in the processing tub; a storage unit for storing the electrolyte; an electrolyte supply unit for supplying the electrolyte stored in the storage unit to the processing tub; a manifold comprising an inflow path, to which the electrolyte supplied by the electrolyte supply unit flows, and an outflow path connected to the inflow path for discharging the electrolyte flowing to the inflow path to the processed object, wherein a discharge hole of the outflow path is immersed in the electrolyte filled in the processing tub; an electrode which is fixed to the manifold so as for one end thereof to pass the outflow path and to be projected toward a lower part of the discharge hole and is electrically connected to the processed object; and a power unit for supplying power to the electrode and the processed object.

The outflow path may be formed to be perpendicular to the lower part of the manifold and the inflow path may be formed to incline toward the outflow path by a predetermined angle on the upper part of the outflow path.

The inflow path of at least two may be formed on the upper part of the outflow path and the at least two inflow paths may have the same interval in a circumferential direction around the outflow path.

The inflow path may be formed as a pair which is symmetrical to each other based on the outflow path.

The inflow path may be formed as two pairs which are symmetrical to each other based on the outflow path.

The two pairs of inflow paths may each be formed at the interval of 90° in a circumferential direction of the outflow path.

The manifold may further include an injection pressure control member combined to the discharge hole to control injection pressure of the electrolyte discharged to the discharge hole.

The electrochemical machine may further include a nozzle to discharge the electrolyte supplied by the electrolyte supply unit and the manifold may further include a joint hole at the front end of the inflow path so as for the nozzle to join to the joint hole.

The manifold may include an inclined part at the lower part thereof which is inclined toward an upper direction facing the outer side around the discharge hole.

The electrode may be fixed at the center of the outflow path so as for the electrolyte discharged through the outflow path to be uniformly discharged around the electrode.

The manifold may further include: a hollow hole, to which the electrode is inserted, which is perpendicularly connected to the outflow path; an upper fixing nut comprising a hollow hole connected to the hollow hole of the manifold for joining to a joint part projected at the upper end of the manifold; and an upper fixing ring interposed between the upper part of the joint part and the upper fixing nut for fixing the electrode inserted into the hollow hole of the manifold through the hollow hole of the upper fixing nut at the center of the hollow hole of the manifold, since the upper fixing nut is compressed while joining.

The manifold may further include: a hollow hole, to which the electrode is inserted, which is perpendicularly connected to the outflow path; a lower fixing nut comprising a hollow hole, to which the electrode inserted into the hollow hole of the manifold is inserted, for joining to the lower part of the hollow hole of the manifold; and a lower fixing ring interposed between the lower fixing nut and a step part of the hollow hole of the manifold for fixing the electrode inserted into the hollow hole of the manifold at the center of the hollow hole of the manifold, since the lower fixing nut is compressed while joining.

BRIEF DESCRIPTION OF THE DRAWINGS

The above and other features and advantages of the present invention will become more apparent by describing in detail exemplary embodiments thereof with reference to the attached drawings in which:

FIGS. 4 and 5 are enlarged views of a part 'A' of FIG. 1, wherein FIG. 4 illustrates that an electrolyte is not discharged through a discharge hole of the manifold and FIG. 5 illustrates an electrolyte is discharged through a discharge hole of the manifold;

DETAILED DESCRIPTION OF THE INVENTION

Figure 1:
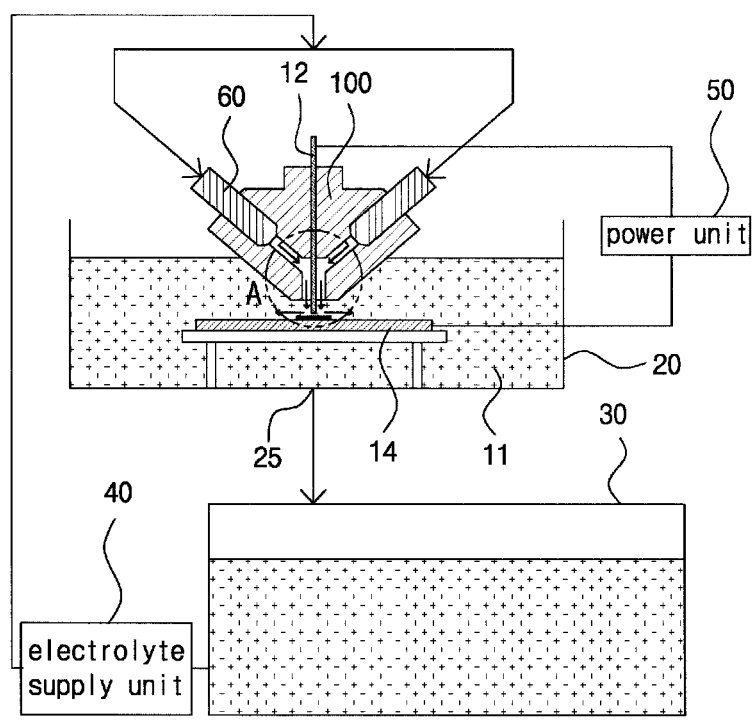
FIG. 1 schematically illustrates an electrochemical machine according to an embodiment of the present invention.

Hereinafter, embodiments of the present invention will be described more fully with reference to the accompanying drawings.

Accordingly, while the embodiments are capable of various modifications and alternative forms, embodiments thereof are shown by way of exemplary in the drawings and will herein be described in detail.

It should be understood, however, that there is no intent to limit exemplary embodiments to the particular forms disclosed, but on the contrary, exemplary embodiments are to cover all modifications, equivalents, and alternatives falling within the scope of the invention.

Also, in the drawings, the thicknesses and sizes are exaggerated for clarity and thus, the present invention is not limited to sizes and thicknesses illustrated in the drawings.

FIG. 1 schematically illustrates an electrochemical machine 10 according to an embodiment of the present invention.

Referring to FIG. 1, the electrochemical machine 10 according to an embodiment of the present invention may include a processing tub 20, an electrode 12, a processed object 14, a storage unit 30, an electrolyte supply unit 40, a power unit 50, and nozzles 60, wherein the processing tub 20 is filled with an electrolyte 11, one end of the electrode 12 is immersed in the electrolyte 11 of the processing tub 20, the processed object 14 is immersed in the electrolyte 11 of the processing tub 20 and is electrically connected with the electrode 12, the storage unit 30 stores the electrolyte, the electrolyte supply unit 40 supplies the electrolyte stored in the storage unit 30 to the processing tub 20, the power unit 50 supplies power to the electrode 12 and the processed object 14, and the nozzles 60 discharge the electrolyte supplied by the electrolyte supply unit 40.

The electrode 12 and the processed object 14 face each other, are spaced apart from each other by a predetermined interval and may be immersed in the electrolyte 11 filled in the processing tub 20. Here, when power is supplied by the power unit 50 to the electrode 12 and the processed object 14, the processed object 14 may be processed such as being etched or stacked.

For example, when power is supplied by the power unit 50 to the electrode 12 and the processed object 14, wherein the electrode 12 is made to be a cathode and the processed object 14 is made to be an anode, the processed object 14 may be etched. On the contrary to this, when power is supplied by the power unit 50 to the electrode 12 and the processed object 14, wherein the electrode 12 is made to be an anode and the processed object 14 is made to be a cathode, electrolytic deposition may be generated and stacked on the processed object 14.

Accordingly, the term 'process' included in the present invention includes both etching and stacking. When in stacking, the processed object 14 functions as a substrate on which a deposition layer is formed.

The processing tub 20 may include an outlet 25 for discharging the electrolyte 11 supplied by the electrolyte supply unit 40 to the storage unit 30.

The electrolyte supply unit 40 is used to supply the electrolyte 11 stored in the storage unit 30 again to the processing tub 20 and may be a predetermined pump.

Accordingly, in the electrochemical machine 10 according to an embodiment of the present invention, the electrolyte 11 may circulate the processing tub 20 and the storage unit 30 by the electrolyte supply unit 40 and the outlet 25.

Although not illustrated in the drawings, the electrochemical machine 10 according to an embodiment of the present invention may further include a water level sensing unit and a water level control unit, wherein the water level sensing unit senses the water level of the electrolyte 11 filled in the processing tub 20 and the water level control unit controls the water level of the electrolyte 11 filled in the processing tub 20.

The water level sensing unit may be a water level sensor and the water level control unit may control at least any one of the electrolyte supply unit 40 and the outlet 25 according to a sense from the water level sensor. The present invention is not particularly restricted.

In electrochemical machining (ECM), electrolytic products such as metal ion and hydrogen gas, which may disturb stable electrolysis process, may be generated. In order to improve quality of ECM, such electrolytic products need to be removed.

Accordingly, the electrochemical machine 10 according to the present invention further includes a manifold 100.

Figure 2:
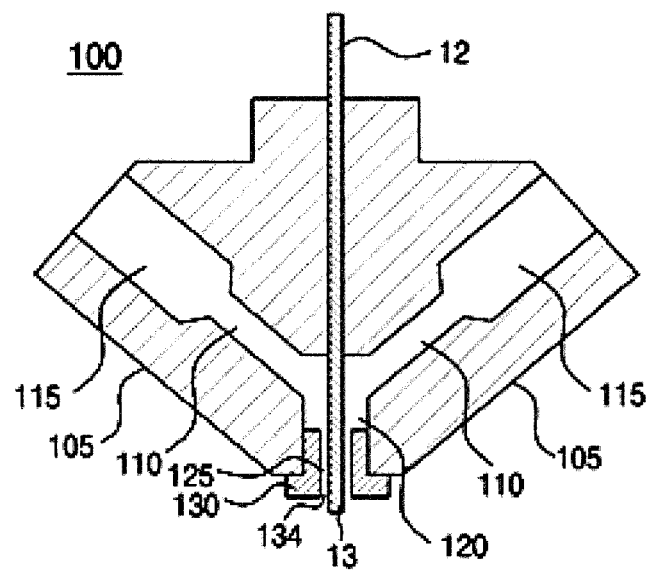
FIG. 2 is a cross-sectional view schematically illustrating a manifold according to an embodiment of the present invention.
Figure 3:
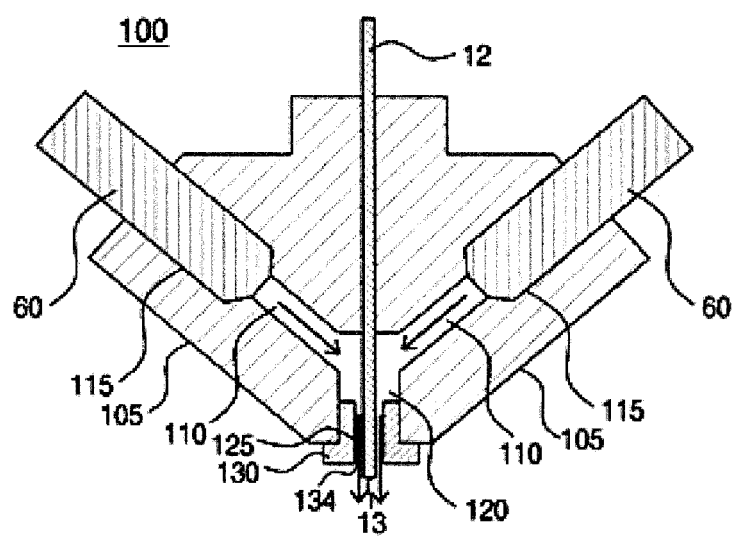
FIG. 3 is a cross-sectional view schematically illustrating the manifold of FIG. 2 to which nozzles are combined.

FIG. 2 is a cross-sectional view schematically illustrating the manifold 100 according to an embodiment of the present invention and FIG. 3 is a cross-sectional view schematically illustrating the manifold 100 of FIG. 2 to which the nozzles 60 are combined.

Referring to FIGS. 2 and 3, the manifold 100 according to an embodiment of the present invention may include an inflow path 110 and an outflow path 120, wherein the electrolyte supplied from the electrolyte supply unit 40 flows to the inflow path 110 and the outflow path 120 is connected to the inflow path 110 and discharges the electrolyte flowed to the inflow path 110 to the processed object 14.

The electrode 12 may be fixed to the manifold 100 so that one end 13 of the electrode 12 passes the outflow path 120 and is projected toward the lower part of a discharge hole 125 of the outflow path 120. Here, the discharge hole 125 of the outflow path 120 may be immersed in the electrolyte 11 filled in the processing tub 20.

Then, while the electrode 12 is fixed to the manifold 100, the one end 13 of the electrode 12 may be immersed in the electrolyte 11 filled in the processing tub 20.

Also, the outflow path 120 is formed to be perpendicular to the lower part of the manifold 100 and the inflow path 110 may be formed on the upper part of the outflow path 120.

Here, the inflow path 110 may be formed to incline toward the outflow path 120 by a predetermined angle.

In addition, the manifold 100 may further include an injection pressure control member 130 which is combined to the discharge hole 125 to control injection pressure of the electrolyte discharged to the discharge hole 125.

The injection pressure control member 130 includes a hollow hole 134 through which the one end 13 of the electrode 12 projected toward the lower part of the discharge hole 125 penetrates. While the one end 13 of the electrode 12 penetrates the hollow hole 134, the injection pressure control member 130 may be screwed to the discharge hole 125.

Then, since a cross section of the discharge hole 125 may be adjusted according to a thickness of the injection pressure control member 130 combined to the discharge hole 125, injection pressure of an electrolyte discharged trough the discharge hole 125 may be adjusted according to a thickness of the injection pressure control member 130 combined to the discharge hole 125.

Also, the manifold 100 may further include a joint hole 115 at the front end of the inflow path 110 so that the nozzles 60 may be joined to the joint hole 115.

That is, in the manifold 100 according to an embodiment of the present invention, an electrolyte supplied from the electrolyte supply unit 40 flows to the inflow path 110 of the manifold 100 through the nozzles 60 and then, the electrolyte may be discharged around the one end 13 of the electrode 12 through the outflow path 120. Here, injection pressure of the electrolyte discharged to the discharge hole 125 may be adjusted by the injection pressure control member 130 combined to the discharge hole 125.

Then, electrolytic products such as metal ion and hydrogen gas generated while ECM may be removed by the electrolyte discharged around the electrode 12 through the discharge hole 125 and thereby, quality of ECM may be improved.

Figure 4:
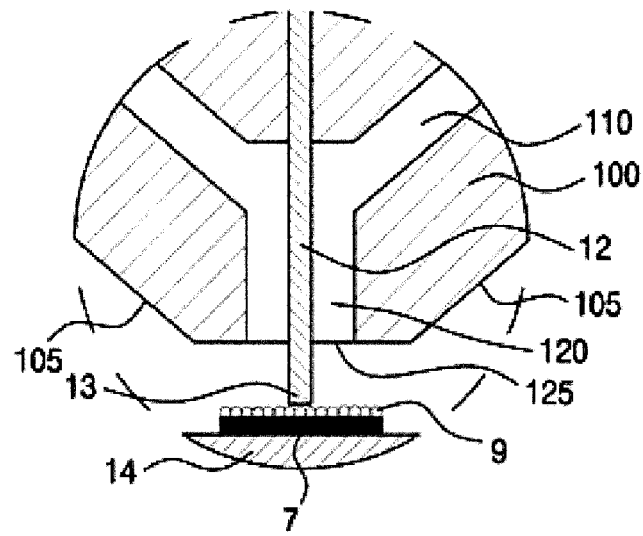
Figure 5:
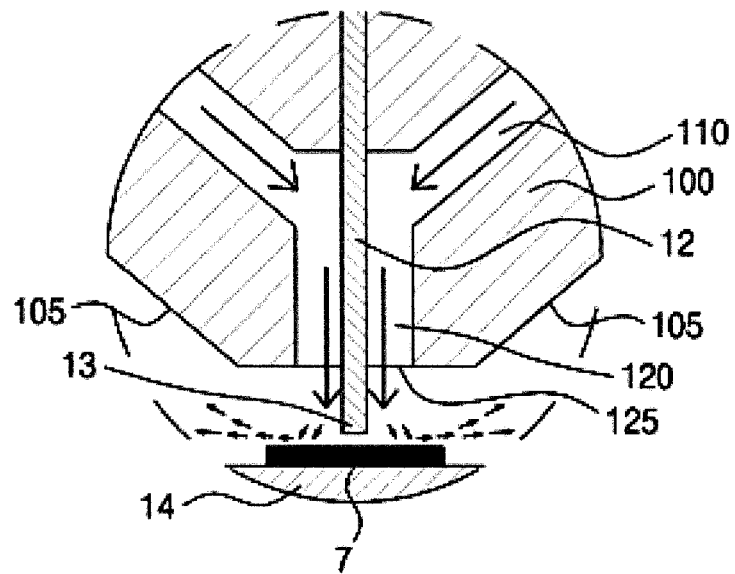

FIGS. 4 and 5 are enlarged views of a part 'A' of FIG. 1, wherein FIG. 4 illustrates that an electrolyte is not discharged through the discharge hole 125 of the manifold 100 and FIG. 5 illustrates an electrolyte is discharged through the discharge hole 125 of the manifold 100.

As illustrated in FIG. 4, when an electrolyte is not discharged through the discharge hole 125 of the manifold 100 and current is applied during ECM, electrolytic products, for example, gas such as hydrogen are generated according to reduction and oxidation reaction. Here, since the generated gas is adsorbed around the electrode 12, the processed object 14 (or substrate), and a deposition layer 7 in the form of air bubbles 9 and thereby, current distribution is changed, quality of a processed material may be lowered.

However, as illustrated in FIG. 5, when an electrolyte is discharged around the electrode 12 through the discharge hole 125 of the manifold 100, the electrolytic products generated while ECM, for example, the air bubbles 9 adsorbed around the electrode 12, the processed object 14 (or substrate), and the deposition layer 7, as in FIG. 4, may be removed and thus, quality of ECM may be improved.

FIGS. 4 and 5 illustrate effect of a stacking process where the deposition layer 7 is formed on the processed object 14 (or substrate). However, such effect also generates in an etching process where the processed object 14 (or substrate) is etched.

In addition, in the lower part of the manifold 100, an inclined part 105 inclined toward an upper direction facing the outer side (that is, the further away from the discharge hole 125) may be formed around the discharge hole 125. The inclined part 105 is formed to prevent the electrolytic product generated while ECM, for example, the air bubbles 9 by hydrogen gas, from being adsorbed to the lower part of the manifold 100.

When the electrode 12 is shaken or moved by external shock during ECM, quality of ECM may be lowered. When an electrolyte is discharged around the electrode 12 as in the electrochemical machine 10 according to the present invention, movement of the electrode 12 made by the discharged electrolyte needs to be minimized.

Accordingly, the inflow path 110 of the manifold 100 according to an embodiment of the present invention may be formed to minimize movement of the electrode 12, when an electrolyte flowing to the inflow path 110 flows to the outflow path 120.

Figure 6:
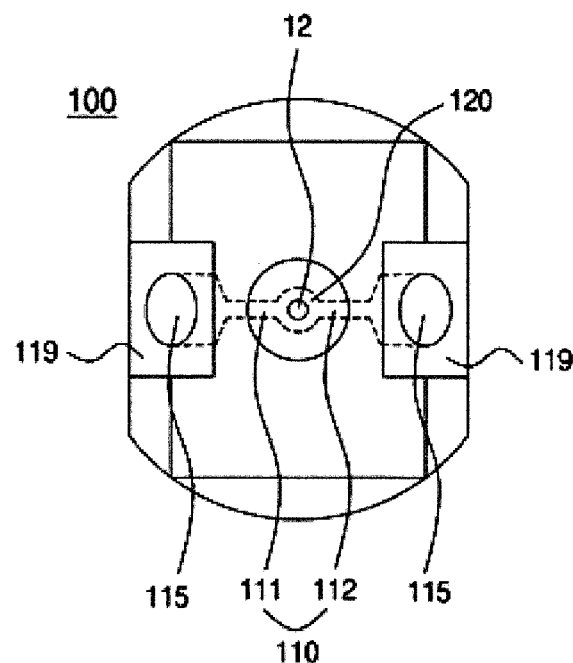
FIGS. 6 and 7 are plane views illustrating various examples of the manifold.
Figure 7:
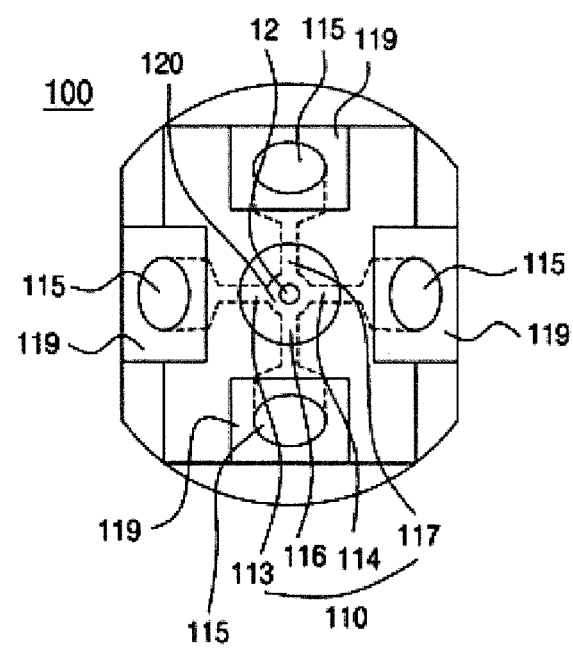

FIGS. 6 and 7 are plane views illustrating various examples of the manifold 100 according to an embodiment of the present invention.

Referring to FIGS. 6 and 7, at least two inflow paths 110 are formed on the upper part of the outflow path 120 in the manifold 100 according to an embodiment of the present invention and may have the same interval in a circumferential direction around the outflow path 120 based on the outflow path 120

For example, based on the outflow path 120, the inflow path 110 may be two at the interval of 180°, three at the interval of 120°, or four at the interval of 90°.

Then, when the electrolyte flowing to the inflow path 110 through the nozzle 60 flows to the outflow path 120, movement of the electrode 12 may be minimized.

Also, as illustrated in FIG. 6, a pair of inflow paths 111 and 112, which are symmetrical to each other, may be formed based on the outflow path 120. That is, two inflow paths 111 and 112 may be formed at the interval of 180° in a circumferential direction of the outflow path 120 and the two inflow paths 111 and 112 may be symmetrical to each other based on the outflow path 120.

In addition, as illustrated in FIG. 7, two pairs of inflow paths 113,114,116, and 117, which are symmetrical to each other, may be formed based on the outflow path 120.

Here, the two pairs of inflow paths 113,114,116, and 117 may be each formed at the interval of 90° in a circumferential direction of the outflow path 120.

Also, the joint hole 115 may include a joint groove 119 at the front end thereof to provide a space for the nozzle 60 to easily joint to the joint hole 115.

The manifold 100 according to an embodiment of the present invention may be formed of a material, for example, a plastic material, to prevent the manifold 100 from being corroded, even if the manifold 100 is immersed in the electrolyte 11, and may be manufactured by the processing or injection molding.

Also, in the manifold 100, the electrolyte discharged through the outflow path 120 needs to be discharged uniformly around the electrode 12 and thereby, the electrode 12 may be fixed to the manifold 100 at the center of the outflow path 120.

For example, during injection molding of the manifold 100, the electrode 12 may be placed at the center of the outflow path 120 to be fixed to the manifold 100 by insert molding or to be detachably fixed to the manifold 100 so that the electrode 12 may be exchanged.

However, as described above, if the electrode 12 is shaken or moved by external shock during ECM, quality of ECM is lowered. Thus, when the electrode 12 is detachably fixed to the manifold 100 so that the electrode 12 may be exchanged, the electrode 12 needs to be strongly fixed at the center of the outflow path 120.

Figure 8:
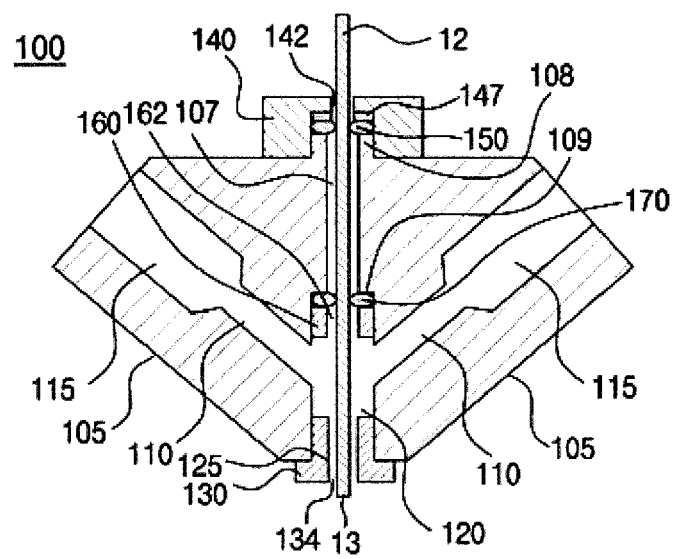
FIG. 8 is a cross-sectional view schematically illustrating a manifold according to another embodiment of the present invention.
Figure 9:
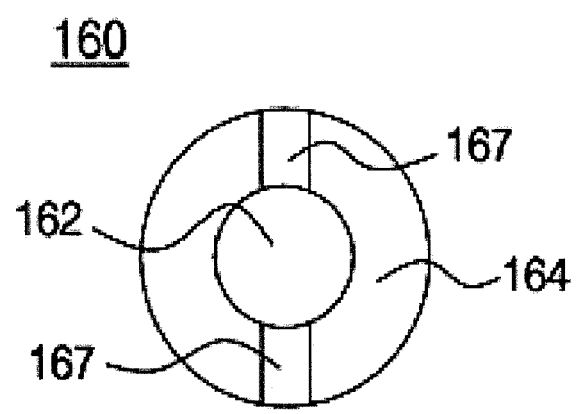
FIG. 9 is a lower fixing nut schematically viewing from the bottom.

FIG. 8 is a cross-sectional view schematically illustrating the manifold 100 according to another embodiment of the present invention and FIG. 9 is a lower fixing nut 160 schematically viewing from the bottom.

Referring to FIGS. 8 and 9, the manifold 100 according to an embodiment of the present invention is perpendicularly connected to the outflow path 120 and may further include a hollow hole 107, an upper fixing nut 140, and an upper fixing ring 150.

The upper fixing nut 140 includes a hollow hole 142 connected to the hollow hole 107 of the manifold 100 and may be screwed to a joint part 108 projected at the upper end of the manifold 100.

The upper fixing ring 150 is interposed between the upper part of the joint part 108 and the upper fixing nut 140 in the manifold 100 and thus, may be compressed when upper fixing nut 140 is screwed to the joint part 108.

Then, the electrode 12 inserted into the hollow hole 107 of the manifold 100 through the hollow hole 142 of the upper fixing nut 140 may be strongly fixed at the center of the hollow hole 107 of the manifold 100 by the compressed upper fixing ring 150.

Also, a washer 147, which smoothly compresses the upper fixing ring 150 when screwing the upper fixing nut 140, may be further included between the upper fixing nut 140 and the upper fixing ring 150.

In addition, the manifold 100 may further include the lower fixing nut 160 and a lower fixing ring 170.

The lower fixing nut 160 includes a hollow hole 162, to which the electrode 12 inserted into the hollow hole 107 of the manifold 100 is inserted, and may be screwed by being inserted into the lower part of the hollow hole 107 of the manifold 100.

The lower fixing ring 170 is interposed between the lower fixing nut 160 and a step part 109 of the hollow hole 107 in the manifold 100 and may be compressed when the lower fixing nut 160 is screwed.

Then, the electrode 12 inserted into the hollow hole 107 of the manifold 100 may be strongly fixed at the center of the hollow hole 107 of the manifold 100 by the compressed lower fixing nut 160.

Here, as illustrated in FIG. 9, a bottom surface 164 of the lower fixing nut 160 may include joint grooves 167 to screw the lower fixing nut 160.

Then, a tool, which fits the joint grooves 167, is used to easily screw the lower fixing nut 160 while the lower fixing nut 160 is inserted into the lower part of the hollow hole 107 of the manifold 100.

Accordingly, in the manifold 100 according to an embodiment of the present invention, the electrode 12 inserted into the hollow hole 107 of the manifold 100 may be strongly fixed at the center of the hollow hole 107 by the upper fixing ring 150 and the lower fixing ring 170.

In particular, the electrode, which is extremely thin, needs to be used for micro ECM such as a micro hole process. The electrode 12 in the manifold 100 according to the embodiment of the present invention may be strongly fixed at the center of the hollow hole 107 of the manifold 100 even if the electrode 12 is extremely thin. Thus, micro ECM such as a micro hole process may be available.

The upper fixing ring 150 and the lower fixing ring 170 may be formed of a rubber material to smoothly accomplish compression.

Also, the upper fixing ring 150 and the lower fixing ring 170 may formed of a chemical resistant material having a tolerance to an electrolyte.

In particular, if the upper fixing ring 150 and the lower fixing ring 170 are formed of a rubber material, compression may be smoothly accomplished and the electrode 12 may be prevented from being damaged while fixing the electrode 12.

In general, an ultra-micro electrode is sealed with a glass tube and thereby, may be damaged by a grab or vibration. However, if the upper fixing ring 150 and the lower fixing ring 170 are formed of a rubber material, the ultra-micro electrode sealed with a glass tube may be accurately aligned and fixed at the center of the outflow path 120 connected to the hollow hole 107 by the upper fixing ring 150 and the lower fixing ring 170, which are formed of a compressed rubber material, and may be prevented from being damaged.

Since the electrochemical machine according to an embodiment of the present invention includes the manifold, which may uniformly discharge the electrolyte supplied from the nozzles while ECM around the electrode, the electrolytic product generated while ECM may be easily removed and thereby, quality of ECM may be improved.

In addition, the electrochemical machine according to an embodiment of the present invention may strongly fix the thin electrode, which enables micro ECM, to an accurate position of the manifold.

As described above, in the electrochemical machine according to the present invention, the electrolytic product generated while ECM may be removed to improve quality of ECM and micro ECM may be available.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electrochemical machine comprising:
    a processing tub filled with an electrolyte;
    an object immersed in the electrolyte filled in the processing tub to be processed by the electrochemical machine;
    a storage unit storing the electrolyte;
    an electrolyte supply unit configured to supply the electrolyte stored in the storage unit to the processing tub;
    a manifold comprising an inflow path, to which the electrolyte supplied by the electrolyte supply unit flows, and an outflow path connected to the inflow path for discharging the electrolyte flowing from the inflow path to the object, wherein a discharge hole of the outflow path is immersed in the electrolyte filled in the processing tub;
    an electrode provided to the manifold to be electrically connected to the object, the electrode extending along the outflow path while being accommodated within the outflow path; and a power unit configured to supply power to the electrode and the object, wherein the manifold further comprises:
- a hollow hole extending within the manifold and accommodating the electrode;
- a boss protruding outwardly from the manifold and having a through hole communicating with the hollow hole to accommodate the electrode;
- a first fixing nut configured to be coupled to the boss and having a though hole communicating with the through hole of the boss to accommodate the electrode;
- a first fixing ring interposed between an end of the boss and the first fixing nut and directly facing the electrode, the first fixing ring expanding toward the electrode while being compressed by the first fixing nut and directly contacting the electrode to hold the electrode at a center of the hollow hole;
- a recess formed within the manifold and communicating with the hollow hole to accommodate the electrode;
- a second fixing nut configured to be coupled to the recess while being inserted into the recess and having a through hole communicating with the hollow hole to accommodate the electrode; and
- a second fixing ring interposed between the second fixing nut and a base of the recess and directly facing the electrode, the second fixing ring expanding toward the electrode while being compressed by the second fixing nut and directly contacting the electrode to hold the electrode at the center of the hollow hole.

2. The electrochemical machine of claim 1, wherein the outflow path is formed at a lower portion of the manifold to be oriented vertically and the inflow path is disposed above the outflow path to incline toward the outflow path by a predetermined angle.

3. The electrochemical machine of claim 2, wherein the inflow path comprising at least two inflow paths is formed above the outflow path and the at least two inflow paths have the same interval in a circumferential direction around the outflow path.

4. The electrochemical machine of claim 2, wherein the inflow path is formed as a pair which is symmetrical to each other based on the outflow path.

5. The electrochemical machine of claim 2, wherein the inflow path is formed as two pairs which are symmetrical to each other based on the outflow path.

6. The electrochemical machine of claim 5, wherein the two pairs of inflow paths are each formed at the interval of 90° in a circumferential direction of the outflow path.

7. The electrochemical machine of claim 1, wherein the manifold further comprises an injection pressure control member installed to the discharge hole to control an injection pressure of the electrolyte discharged through the discharge hole, and the injection pressure control member is immersed in the electrolyte of the processing tub to directly face the object in the processing tub.

8. The electrochemical machine of claim 1, further comprising a nozzle to discharge the electrolyte supplied by the electrolyte supply unit, wherein the manifold further comprises a joint hole at a front end of the inflow path so as for the nozzle to join to the joint hole.

9. The electrochemical machine of claim 1, wherein the manifold comprises an inclined part at a lower portion thereof which is inclined toward an upper direction.

10. The electrochemical machine of claim 1, wherein the electrode is fixed at a center of the outflow path so as for the electrolyte discharged through the outflow path to be uniformly discharged around the electrode.

11. The electrochemical machine of claim 1, wherein the hollow hole is located at an upper portion of the manifold and the outflow path is located at a lower portion of the manifold, wherein the hollow hole is connected to the outflow path and is aligned with the outflow path in a vertical direction, and the electrode continuously passes through the aligned hollow hole and the outflow path.

12. The electrochemical machine of claim 11, wherein the hollow hole includes:
- a first end located at a top of the manifold; and
- a second end located within the manifold to be opposite to the first end and connected to outflow path, wherein the first fixing nut, the first fixing ring, and the boss are provided to the first end of the hollow hole, and the second fixing nut, the second fixing ring, and the recess are provided to the second end of the hollow hole.

13. The electrochemical machine of claim 1, wherein the recess is disposed between the hollow hole and the outflow path and connects the hollow hole and the outflow path.

14. The electrochemical machine of claim 1, wherein the electrode includes:
- an upper body coupled to an upper portion of the manifold; and
- a lower body accommodated in the outflow path, the lower body having a tip which protrudes out of the manifold via the discharge hole and is immersed in the electrolyte filled in the processing tub.

15. The electrochemical machine of claim 7, wherein the injection pressure control member includes a through hole connecting the outflow path and an outside of the manifold, wherein the electrode passes through the though hole of the injection pressure control member and protrudes out of the manifold.

16. The electrochemical machine of claim 7, wherein the injection pressure control member includes:
- a hollow body inserted into the discharge hole; and
- a flange formed at an end of the hollow body and latched on a portion of the manifold around the discharge hole.

* * * * *